United States Patent [19]

Teske et al.

[11] 3,963,115
[45] June 15, 1976

[54] APPARATUS FOR MONITORING THE OPERATION OF A DRAG CHAIN CONVEYOR

[76] Inventors: Fritz Teske, Industriestrasse 28;
Lothar Teske, Industriestrasse 30, both of Porz-Westhoven, Germany

[22] Filed: Oct. 9, 1974

[21] Appl. No.: 513,502

[52] U.S. Cl. .............................. 198/208; 198/40; 198/232; 74/242.8; 226/45
[51] Int. Cl.² ........................................ B65G 15/30
[58] Field of Search ............ 198/40, 208, 232, 168, 198/171–174; 91/1, 171; 200/56 R, 56 A, 61.13, 61.18, 82 R, 82 C; 340/213 R, 220, 222, 240, 420, 248 R; 74/242.1 R, 242.1 A, 242.1 FP, 242.8, 242.11 R, 242.11 A, 242.11 C; 226/11, 45, 100; 340/259, 258 C

[56] References Cited
UNITED STATES PATENTS

| | | | |
|---|---|---|---|
| 2,209,476 | 7/1940 | Redler | 198/168 |
| 2,230,745 | 2/1941 | Eiselstein | 198/232 |
| 2,438,068 | 3/1948 | Mercier | 198/208 |
| 2,635,736 | 4/1953 | Rust | 198/208 |
| 2,932,382 | 4/1960 | James | 198/40 |
| 3,026,992 | 3/1962 | Douglass | 198/208 |
| 3,277,305 | 10/1966 | Anderman | 226/45 |
| 3,636,817 | 1/1972 | Shapiro | 91/1 |
| 3,777,879 | 12/1973 | Dehne | 198/208 |
| 3,792,459 | 2/1974 | Snyder | 198/232 |

Primary Examiner—Evon C. Blunk
Assistant Examiner—Joseph E. Valenza
Attorney, Agent, or Firm—Spencer & Kaye

[57] ABSTRACT

With a drag chain conveyor there is, for a timely warning of malfunctioning, associated a monitoring apparatus. The drag chain conveyor has a conveyor chain assembly which includes an endless conveyor chain trained about a drive sprocket and a return sprocket and a biasing mechanism for displacing the bearing support of the return sprocket to maintain the chain at a predetermined tension. The monitoring apparatus has at least one sensor connected to the chain assembly for monitoring the magnitude of at least one of the following chain parameters: chain tension, chain wear and chain slack. The sensor is coupled to a signal transmitter which emits a signal upon a nonpermitted deviation from the parameter magnitudes. A signal-responsive device is connected to the signal transmitter for emitting, for example, a visual warning signal.

12 Claims, 3 Drawing Figures

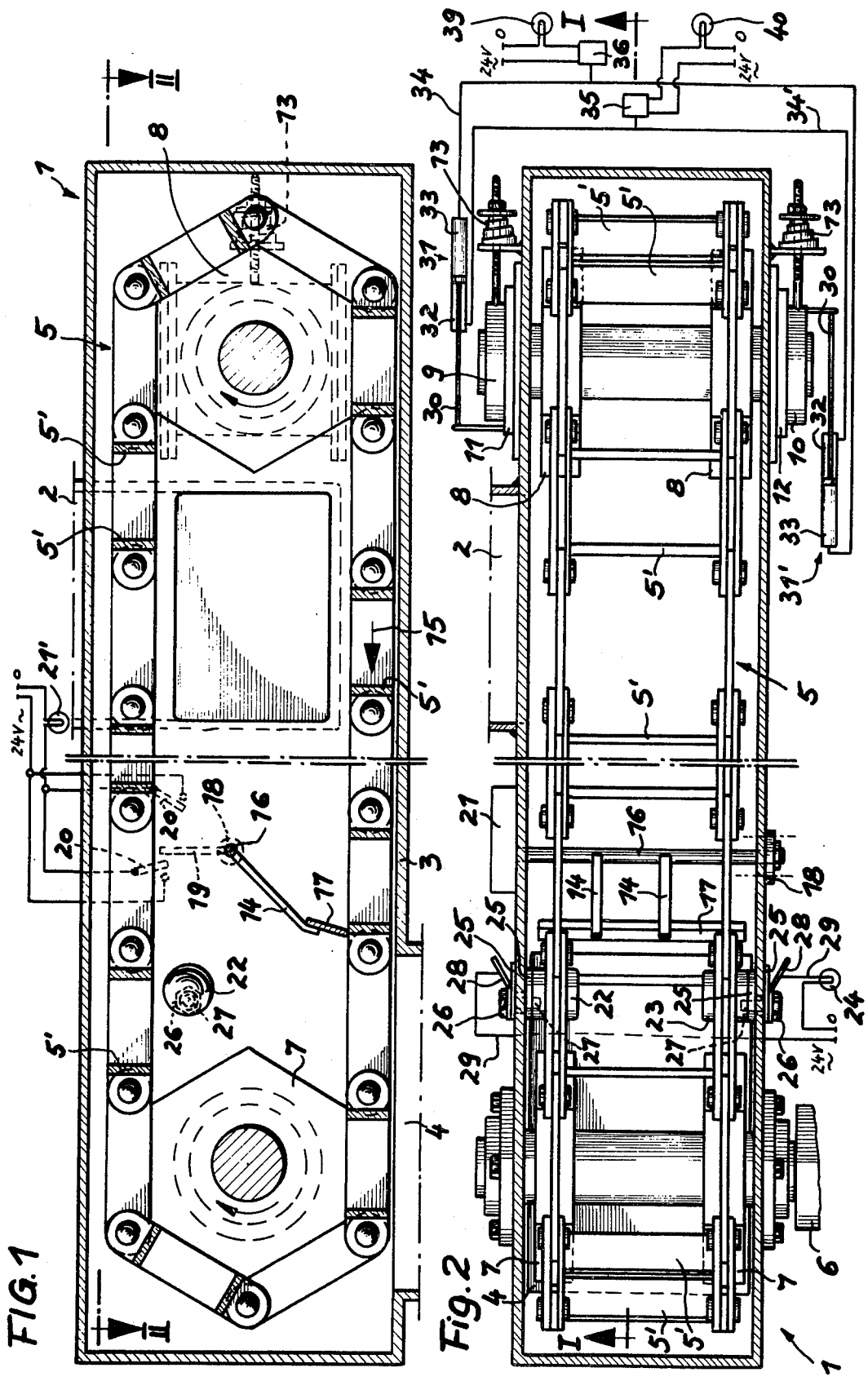

APPARATUS FOR MONITORING THE OPERATION OF A DRAG CHAIN CONVEYOR

BACKGROUND OF THE INVENTION

This invention relates to an apparatus for monitoring the operation of a drag chain conveyor, the traction mechanism of which comprises at least one endless chain that is trained about a drive sprocket and a return sprocket and which has a series of dragging members. The bearing of the return sprocket is displaceable in the longitudinal direction of the conveyor. The endless chain is tensioned with a constant bias by means of an energy storing device (such as spring elements) that exerts a force on the bearing support of the return sprocket.

Drag chain conveyors serve for the continuous transport of bulk material (such as coal) along predetermined fixed conveyor paths, for example, for feeding steam generating equipment.

The traction mechanism which is disposed in a closed trough and which transports the bulk material from the charging end of the conveyor to the conveyor outlet, may be formed as a single-strand chain or a double-strand chain.

Although drag chain conveyors are relatively safe transporting means, they are, however, not free from operational disturbances. Thus, for example, a breakage of the chain may occur. The repair of such a breakdown is very time consuming and expensive because, among others, first the bulk material has to be removed from the trough.

Many types of breakdowns which necessarily cause an interruption in the transportation of the bulk material could be avoided if their causes are recognized and elminated in time. For such measures much less time is required than for repairing the consequential damage.

SUMMARY OF THE INVENTION

It is an object of the invention to provide a continuous monitoring of the operation of drag chain conveyors for the purpose of maintaining the inoperative periods of the drag chain conveyor as short as possible.

This object and others to become apparent as the specification progresses, is accomplished by the invention, according to which, briefly stated, with a drag chain conveyor there is associated a monitoring apparatus. The drag chain conveyor has a conveyor chain assembly which includes an endless conveyor chain trained about a drive sprocket and a return sprocket and a biasing mechanism for displacing the bearing support of the return sprocket to maintain the chain at a predetermined tension. The monitoring apparatus has at least one sensor connected to the chain assembly for monitoring the magnitude of at least one of the following chain parameters: chain tension, chain wear and chain slack. The sensor is coupled to a signal transmitter which emits a signal upon a non-permitted deviation from the parameter magnitudes. A signal-responsive device is connected to the signal transmitter for emitting, for example, a visual warning signal.

By virtue of the measures provided according to the invention, the source of trouble, for example an overcharging of the conveyor with the bulk material leading to an overloading of the chain, is spotted in time and, merely by decreasing the charging rate at the input end of the drag chain conveyor, this potential source of trouble may be eliminated without interrupting the feeding operation of the conveyor.

By virtue of sensing the chain height, an excessive wear of the chain is monitored, so that its replacement may be scheduled well in advance for a period when the plant is, in any event, not operating.

The monitoring device for the chain bias gives a signal if there occurs a drop, below a permissible value, of the chain tension. Such a drop may be the result of a chain stretch, caused, in turn, for example, by an overload of the conveyor and/or an excessive wear of the chain.

Even if, despite the above safety measures, the chain breaks, for example, because of failure of material, the monitoring device has the significant advantage that the drive of the chain conveyor is, immediately upon chain breakage, either automatically or manually switched off before the broken chain is jammed within the conveyor trough.

Caking of the bulk material in the zone of the chain-tensioning mechanism caused, for example, by an overloading of the trough with the bulk material, may result in the phenomenon that the energy storing devices (springs) that act upon the chain for maintaining a predetermined chain bias, may be still maintained at the bias by the wedged-in bulk material although the distance between the shafts of the drive sprocket and the return sprocket has decreased. In such an event the chain slack monitoring apparatus gives a timely signal so that serious consequential damages, such as chain breakage, can be avoided.

It is expedient to arrange the charge height monitoring device in the vicinity of, and preferably above, the discharge opening of the conveyor because with such an arrangement the caking of bulk material may be timely recognized in the outlet zone of the conveyor as well.

By virtue of arranging a chain wear monitoring device which preferably is of the mechanical contacting type, above the lower reach of the chain in contact therewith, the monitoring device may be of very simple structure, because, in case of an empty trough, the lower chain reach lies on the trough bottom and thus for monitoring the height of the chain, only the upper side of the chain can be contacted. If the upper reach of the conveyor chain is to be sensed, both the upper and the lower side of the chain reach should be associated with separate sensor devices.

BRIEF DESCRIPTION OF THE DRAWINGS

FIG. 1 is a sectional side elevational view of a preferred embodiment of the invention taken along line I—I of FIG. 2.

FIG. 2 is a sectional top plan view taken along line II—II of FIG. 1.

DESCRIPTION OF THE PREFERRED EMBODIMENT

Figure 3:
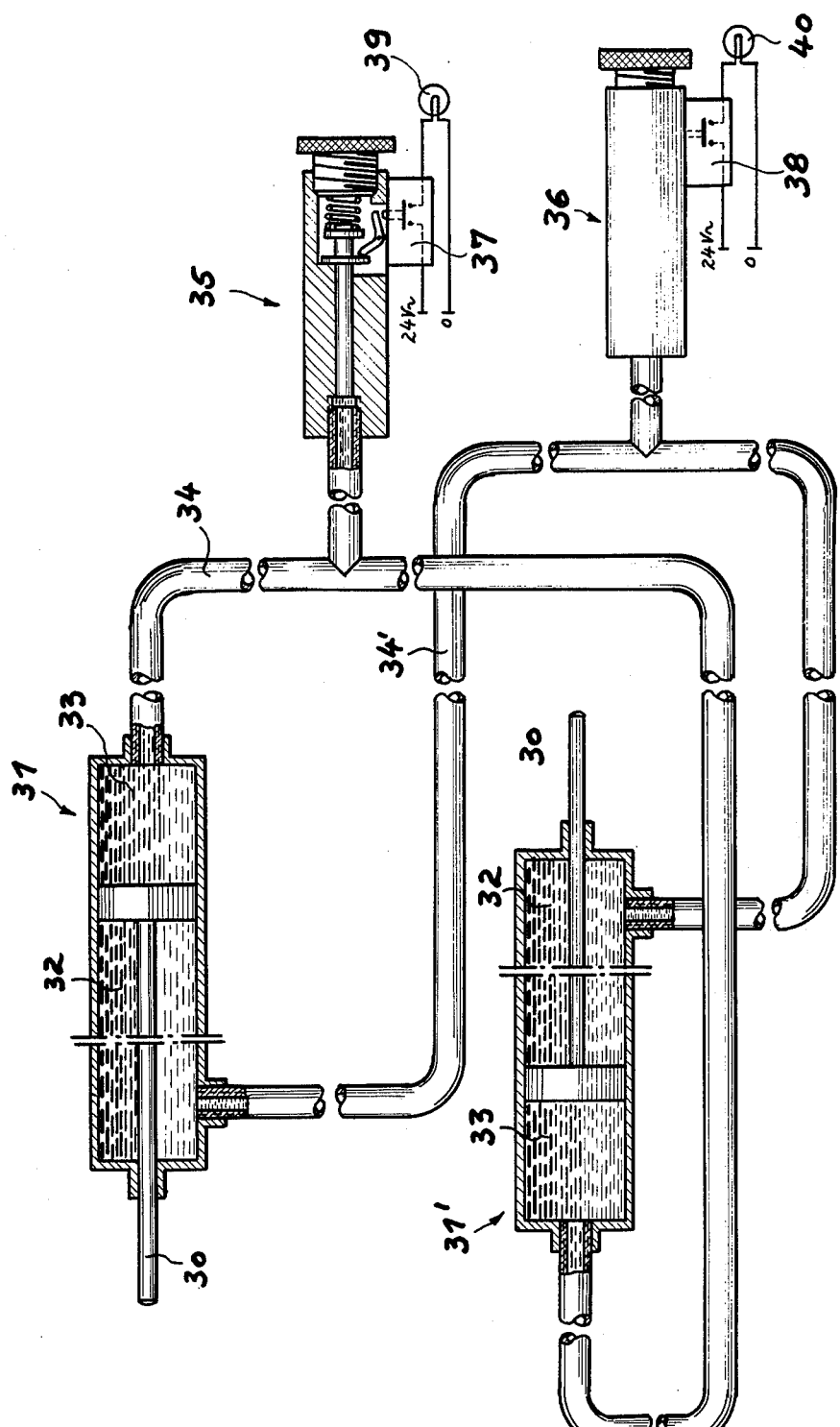
FIG. 3 shows details, partly in section, of monitoring circuits incorporated in the preferred embodiment.

Turning now to FIGS. 1 and 2, there is shown a drag chain conveyor which has a trough 1 closed at all sides and which at one end has an input chute arranged obliquely with respect to one of the side walls of the trough and which serves as a material charger 2. At the other end of the chain conveyor there is provided, in the bottom 3 of the trough 1, a material discharge opening 4. As traction means there is provided a two-strand endless forked link chain 5 having material dragging members 5'. The endless chain 5 is trained about a drive sprocket 7 rotated by a motor 6 and about a return sprocket 8.

The return sprocket 8 is constituted as a chain tensioning means. For this purpose the bearing 9, 10 supporting the shaft of the return sprocket 8 is secured to bearing supports 11, 12, respectively, which are displaceable in the length dimension of the conveyor. Each support 11, 12 is in engagement with spring elements 13 which maintain the return sprocket 8 and thus the endless chain 5 at a constant bias.

Above the discharge opening 4 and above the lower reach of the endless chain 5 there is disposed a lever 14 which is pivotally supported on a shaft 16 that extends horizontally and perpendicularly to the feed direction 15 of the bulk material. At that end of the lever 14 which is directed obliquely downwardly in the direction of feed there is affixed a plate-shaped follower 17 adapted to engage the lower reach of the chain 5. The pivot shaft 16 of the lever 14 journals in bearings 18 affixed to the lateral walls of the conveyor trough.

The lever 14 is provided with a radially projecting switching arm 19 which cooperates with switch members 20 of an electrical signal transmitter 21 which, when the switching arm 19 is in engagement with the one or the other switching member 20, closes an electric circuit of a signalling device including, for example, a signalling lamp 21'. This occurrence takes place when the follower 17 is either lifted by the bulk material which has accumulated in the trough 1 or in the discharge opening 4, or it drops below a predetermined extent as a result of a predetermined amount of chain wear.

Spaced from the bearings of the lever shaft 16 there are affixed, at both side walls of the trough 1, electric contacts 22 and 23 which are adjustable in their height and which are electrically insulated from the trough 1. The contacts 22 and 23 form part of an electric circuit (signal transmitter) containing a further signalling lamp 24. These contacts 22 and 23 may be interconnected, and thus closed directly by the chain 5 in case of an excessive slack thereof, causing the circuit to be closed. To this circuit there is applied a 24-volt a.c. voltage which is sufficiently low (less than 40V) to be harmless to humans. the use of an alternating voltage is advantageous because in this manner there can be no anode or cathode deposits that may occur if d.c. voltage is applied. Such deposits may adversely affect the operation of the electric switches. It is expedient to arrange this slack monitoring device in the vicinity of the drive sprocket 7 so as not to be affected by the bulk material that may adhere to the trough. It is further advantageous to arrange the slack sensors below the upper chain reach to cooperate therewith.

The contacts 22 and 23 have a cylindrical shape and are attached to the trough 1 by screws 26 with the interposition of insulating discs 25. Each screw 26 is threaded into a threaded bore 27 which, in turn, is arranged eccentrically in the contacts. Each screw 26 further supports a separate contact leaf 28 to which there are connected electric conductors 29.

Referring now in FIGS. 2 and 3, to each support which carries the bearings 9, 10 of the return sprocket 8, there are secured piston rods 30 of hydraulic cylinders 31, 31' which may be pressurized with hydraulic liquid on both sides of a piston disposed in each cylinder and which are supported on the trough 1. The pressure chambers 32 of the cylinders 31, 31' at the side of the piston rod and the pressure chambers 33 that are remote from the piston rods 30 are interconnected by conduits 34, 34'.

To the conduits 34, 34' there are connected switches 35, 36 which respond to sudden pressure increases. The switches 35, 36 actuate electrical switches 37, 38 which are part of electric circuits also containing signalling lamps 39, 40. Each hydraulic switch 35, 36 essentially comprises a cylinder, the piston of which is displaced against the force of a spring element in case of an increase in pressure. The piston rod acts directly on the associated switch component of the electric switch 35 or 36.

Instead of an axially displaceable piston, the hydraulic switches 35, 36 each may have a diaphragm for defining the above-described pressure chambers.

The above-described hydraulic and electric control system becomes effective when the chain tension, for example, caused by a rupture in the chain 5, abruptly drops, because in such a case the spring elements 13 shift the return sprocket 8 towards the drive sprocket 7. At the same time, the pistons connected with the piston rods 30 are also displaced relative to the cylinders. The result of this occurrence is that the pressure medium is, through the conduits 34, 34' driven from the pressure chamber 32 of the cylinder 31 into the pressure chamber 32 of the cylinder 31' in an impact-like manner and similarly, the pressure medium is suddenly driven from the pressure chamber 33 of the cylinder 31' into the pressure chamber 33 of the cylinder 31. The dynamic pressure generated in the conduits in this manner exerts a force on the pistons of the hydraulic switches 35, 36 and, as a result, the piston rods of these pistons actuate the electric switches 37, 38. This arrangement operates in a reliable manner even if, in case of a two-strand conveyor chain 5, a sudden change in length of only one strand occurs.

If, on the other hand, there occurs only a slow, gradual change of the axial distance between the return sprocket 8 and the drive sprocket 7, for example, because of a stretch of chain 5 caused by temperature changes (such stretch may be significant if, for example, the conveyor is over 10 m long and the bulk material has a temperature of 400°C), the pressure medium, such as oil, flows slowly without pressure increase through the conduits 34, 34' so that in such a case the hydraulic switches 35, 36 do not respond, whereby a false alarm is avoided.

It is to be understood that instead of a hydraulic system, a similarly operating pneumatic arrangement may be used.

Instead of two cylinders 31, 31' it is feasible to use only a single cylinder, in which case the two cylinder chambers on either side of the piston are interconnected with a conduit which, in turn, is coupled to a dynamic pressure-responsive device, such as switch 35 or 36.

Instead of the visual warning devices, such as lamps 21', 24, 39 and 40, audible warning devices, such as buzzers, bells or horns may be used. Or, the warning devices may be replaced (or supplemented) by a switch contained in the energizing circuit of the conveyor drive mechanism. In this manner, when the magnitude of chain parameters (such as height, or slack, or tension) deviates from a permissible, predetermined value, the conveyor is automatically stopped.

It will be understood that the above description of the present invention is susceptible to various modifications, changes and adaptations, and the same are intended to be comprehended within the meaning and range of equivalents of the appended claims.

We claim:

1. In a drag chain conveyor including a trough; an endless conveyor chain disposed in the trough and trained about a drive sprocket and a return sprocket for being supported with a slack and at a height of predetermined magnitude; means for driving the drive sprocket; a rotary shaft on which the return sprocket is mounted; bearing means for the return sprocket; two bearing supports on each end of the rotary shaft; the bearing supports being displaceable along the direction of conveyance; means exerting a force on the bearing supports in a direction oriented away from the drive sprocket for tensioning the conveyor chain with a bias of predetermined magnitude, the improvement comprising a monitoring apparatus including in combination
   a. a first and a second cylinder, each having an inner space;
   b. a separate piston slidably arranged in each cylinder and dividing the inner space of each cylinder into a first and a second cylinder chamber;
   c. a first conduit maintaining communication between said first cylinder chambers of said first and second cylinders for transferring pressure medium between said first cylinder chambers of said first and second cylinders during displacement of either piston in its respective cylinder;
   d. a second conduit maintaining communication between said second cylinder chambers of said first and second cylinders for transferring pressure medium between said second cylinder chambers of said first and second cylinders during displacement of either piston in its respective cylinder;
   e. a signal transmitter means for emitting a signal;
   f. a first piston rod affixed to the piston disposed in said first cylinder and passing through said first cylinder chamber of said first cylinder, said first piston rod being connected to the one of said bearing supports for displacing said piston in said first cylinder in response to a change in the position of said one bearing support;
   g. a second piston rod affixed to the piston disposed in said second cylinder and passing through said first cylinder chamber of said second cylinder, said second piston rod being connected to the other of said bearing supports for displacing said piston in said second cylinder in response to a change in the position of said other bearing support;
   h. separate dynamic pressure sensing means connected to each conduit for responding solely to dynamic pressures generated in said conduits by a sudden change in the position of said bearing supports, said dynamic pressure sensing means being connected to said signal transmitter means; and
   i. signal-responsive means connected to said signal transmitter means for responding to said signal.

2. A drag chain conveyor as defined in claim 1, wherein said signal transmitter means includes first and second electric circuits each containing a switch for closing and opening the respective circuit and each being connected to said signal responsive means, each electric switch being connected to a separate one of said dynamic pressure sensing means.

3. In a drag chain conveyor including a trough; an endless conveyor chain disposed in the trough and trained about a drive sprocket and a return sprocket for being supported with a slack and at a height of predetermined magnitude; the conveyor chain having an upper reach; means for driving the drive sprocket; bearing means for the return sprocket; bearing support means being displaceable along the direction of conveyance; means exerting a force on the bearing support means in a direction oriented away from the drive sprocket for tensioning the conveyor chain with a bias of predetermined magnitude, the improvement comprising a monitoring apparatus including in combination
   a. an electric switch constituted by two substantially horizontally spaced electric contacts secured to said trough below said upper reach; said contacts cooperating with said upper reach of said chain conveyor to be electrically connected with one another by said chain conveyor as said upper reach exceeds a slack of a predetermined magnitude;
   b. an electric circuit containing said switch; said circuit being in an open state when said upper reach is out of engagement with said contacts; said circuit being in a closed state when said upper reach is in engagement with said contacts; and
   c. signal-responsive means connected to said circuit for responding to the closed state thereof.

4. A drag chain conveyor as defined in claim 3, wherein said contacts are situated in the vicinity of said drive sprocket.

5. A drag chain conveyor as defined in claim 3, including means for adjusting the height position of said switch.

6. A drag chain conveyor as defined in claim 5, wherein said contacts have a cylindrical configuration; means providing an eccentric threaded bore in each cylindrical contact; further comprising screw means threaded into each said bore and attached to said trough.

7. In a drag chain conveyor including a trough; an endless conveyor chain disposed in the trough and trained about a drive sprocket and a return sprocket for being supported with a slack and at a height of predetermined magnitude; the conveyor chain having a lower reach including a downwardly oriented side supported on the trough and an upwardly oriented side; means for driving the drive sprocket; bearing means for the return sprocket; bearing support means being displaceable along the direction of conveyance; means exerting a force on the bearing support means in a direction oriented away from the drive sprocket for tensioning the conveyor chain with a bias of predetermined magnitude, the improvement comprising a monitoring apparatus including in combination
   a. a sensor lever means pivotally held in said trough and being in continous contact with said upwardly oriented side of said lower reach;
   b. a switching arm affixed to said sensor lever means and moving therewith as a unit;
   c. an electric circuit containing two switches disposed on either side of said switching arm; said electric circuit being in an open state when both said switches are open; said electric circuit being in a closed state when either one of said switches is closed; said switching arm being arranged for closing the one switch when said sensor lever means senses a height position of said lower reach above a predetermined magnitude and for closing the other switch when said sensor lever means senses a height position of said lower reach below a predetermined magnitude; and d. signal-responsive means connected to said circuit for responding to the closed state thereof.

8. A drag chain conveyor as defined in claim 7, further including means defining a discharge opening in said trough for discharging the material transported by said conveyor; wherein said sensor lever means is disposed in the vicinity of said discharge opening.

9. A drag chain conveyor as defined in claim 7, further including a plate-shaped follower member affixed to said sensor lever means remote from its pivotal attachement, said plate-shaped follower member being in continuous engagement with said upwardly oriented side of said lower reach for sensing the height thereof.

10. A drag chain conveyor as defined in claim 7, wherein said two switches determine opposite limit positions of said sensor lever means for defining, respectively, the permissible maximum and minimum chain height depending, respectively, from the quantity of material loaded into the conveyor and the wear of the conveyor chain.

11. In a drag chain conveyor including a trough; an endless conveyor chain disposed in the trough and trained about a drive sprocket and a return sprocket for being supported with a slack and at a height of predetermined magnitude; the conveyor chain having a lower reach including a downwardly oriented side supported on the trough and an upwardly oriented side; the conveyor chain further having an upper reach; means for driving the drive sprocket; bearing means for the return sprocket; bearing support means being displaceable along the direction of conveyance; means exerting a force on the bearing support means in a direction oriented away from the drive sprocket for tensioning the conveyor chain with a bias of predetermined magnitude, the improvement comprising a monitoring apparatus including in combination
   a. a first sensing system having
      1. a follower pivotally held in said trough and being in continuous contact with said upwardly oriented side of said lower reach for continously sensing the height position of said upwardly oriented side;
      2. a first signal-transmitter means having an inoperative state and an operative state in which it emits a signal; said follower being operatively connected to said first signal-transmitter means for placing it in the operative state when the follower exceeds a predetermined upper position and for placing it in the operative state when the follower drops below a predetermined lower position; said follower maintaining said first signal-transmitter means in the inoperative state when said follower is situated between said predetermined upper and lower positions; and
      3. a first signal-responsive means connected to said first signal-transmitter means for responding to said signal;
   b. a second sensing system having
      1. an electric switch constituted by two substantially horizontally spaced electric contacts secured to said trough below said upper reach; said contacts cooperating with said upper reach of said chain conveyor to be electrically connected with one another by said chain conveyor as said upper reach exceeds a slack of a predetermined magnitude;
      2. an electric circuit containing said switch; said circuit being in an open state when said upper reach is out of engagement with said contacts; said circuit being in a closed state when said upper reach is in engagement with said contacts; and
      3. a second signal-responsive means connected to said circuit for responding to the closed state thereof; and
   c. a third sensing system having
      1. a piston rod connected to said bearing support means, said piston rod being displaced by said bearing support means upon its shifting movement;
      2. a piston affixed to said piston rod;
      3. a cylinder defining a cylinder chamber in which said piston is displaceably received;
      4. hydraulic fluid accommodated in said cylinder chamber;
      5. conduit means communicating with said clyinder chamber; said fluid traveling in said conduit upon movement of said piston;
      6. dynamic pressure sensing means connected to said conduit for responding solely to dynamic pressures generated in said ocnduit by a sudden change in the position of said hearing support means;
      7. a second signal transmitter means for emitting a signal; said dynamic pressure sensing means being connected to said second signal transmitter means for causing the latter to emit a signal when said dynamic pressure sensing means responds to said sudden change; and
      8. a third signal-responsive means connected to said second signal transmitter means for responding to said signal.

12. In a drag chain conveyor including a trough; an endless conveyor chain disposed in the trough and trained about a drive sprocket and a return sprocket for being supported with a slack and at a height of predetermined magnitude; the conveyor chain having a lower reach including a downwardly oriented side supported on the trough and an upwardly oriented side; means for driving the drive sprocket; bearing means for the return sprocket; bearing support means being displaceable along the direction of conveyance; means exerting a force on the bearing support means in a direction oriented away from the drive sprocket for tensioning the conveyor chain with a bias of predetermined magnitude, the improvement comprising a monitoring apparatus including in combination
   a. a follower pivotally held in said trough and being in continuous contact wiht said upwardly oriented side of said lower reach for continuously sensing the height position of said upwardly oriented side;
   b. a signal transmitter means having an inoperative state and an operative state in which it emits a signal; said follower being operatively connected to said signal transmitter means for placing it in the operative state when the follower exceeds a predetermined upper position and for placing it in the operative state when the follower drops below a predetermined lower position; said follower maintaining said signal transmitter means in the inoperative state when said follower is situated between said predetermined upper and lower positions; and
   c. signal-responsive means connected to said signal transmitter means for responding to said signal.

* * * * *